United States Patent [19]

Gibas

[11] Patent Number: 4,798,265
[45] Date of Patent: Jan. 17, 1989

[54] SLACK ADJUSTER LUBRICATOR AND METHODS OF USE

[75] Inventor: Daniel F. Gibas, Niagara Falls, N.Y.

[73] Assignee: Ivan's Idiosyncrasy, Inc., Niagara Falls, N.Y.

[21] Appl. No.: 117,474

[22] Filed: Nov. 5, 1987

[51] Int. Cl.$^4$ .............................................. F16N 3/00
[52] U.S. Cl. ............................ 184/105.1; 188/79.5 S
[58] Field of Search ............... 188/79.5 K; 184/105.1, 184/105.2, 105.3, 109, 5.1, 88.1

[56] References Cited

U.S. PATENT DOCUMENTS

| | | | |
|---|---|---|---|
| 1,687,014 | 10/1928 | Gatchell . | |
| 2,003,709 | 6/1935 | Eisenhauer | 184/105.3 |
| 2,050,572 | 8/1936 | Jones | 184/105.1 X |
| 2,187,608 | 1/1940 | Kropp . | |
| 2,248,980 | 7/1941 | Berg . | |
| 2,272,636 | 2/1942 | Dennis | 184/105.1 |
| 3,098,541 | 7/1963 | Kadas | 184/5.1 |
| 3,101,812 | 8/1963 | Mercer, Sr. | 184/105.1 |
| 3,158,227 | 11/1964 | Williamson | 184/105.1 X |
| 3,187,840 | 6/1965 | Williamson | 184/105.3 |
| 4,168,766 | 9/1979 | Schultz | 184/5.1 |
| 4,499,978 | 2/1985 | Norcross | 188/79.5 K |

Primary Examiner—Leonard E. Smith
Attorney, Agent, or Firm—Howard M. Ellis

[57] ABSTRACT

Air brake slack adjusters having fouled locking collar mechanisms can be packed with grease in the absence of an effective lubrication fitting to free-up their moving parts by encasing the exterior adjusting head and locking collar in a high pressure lubrication chamber, and injecting lubricant therein by means of a conventional grease gun. The device provides an important economic advantage by lowering vehicle maintenance costs by substantially reducing the frequency of slack adjuster replacement.

9 Claims, 1 Drawing Sheet

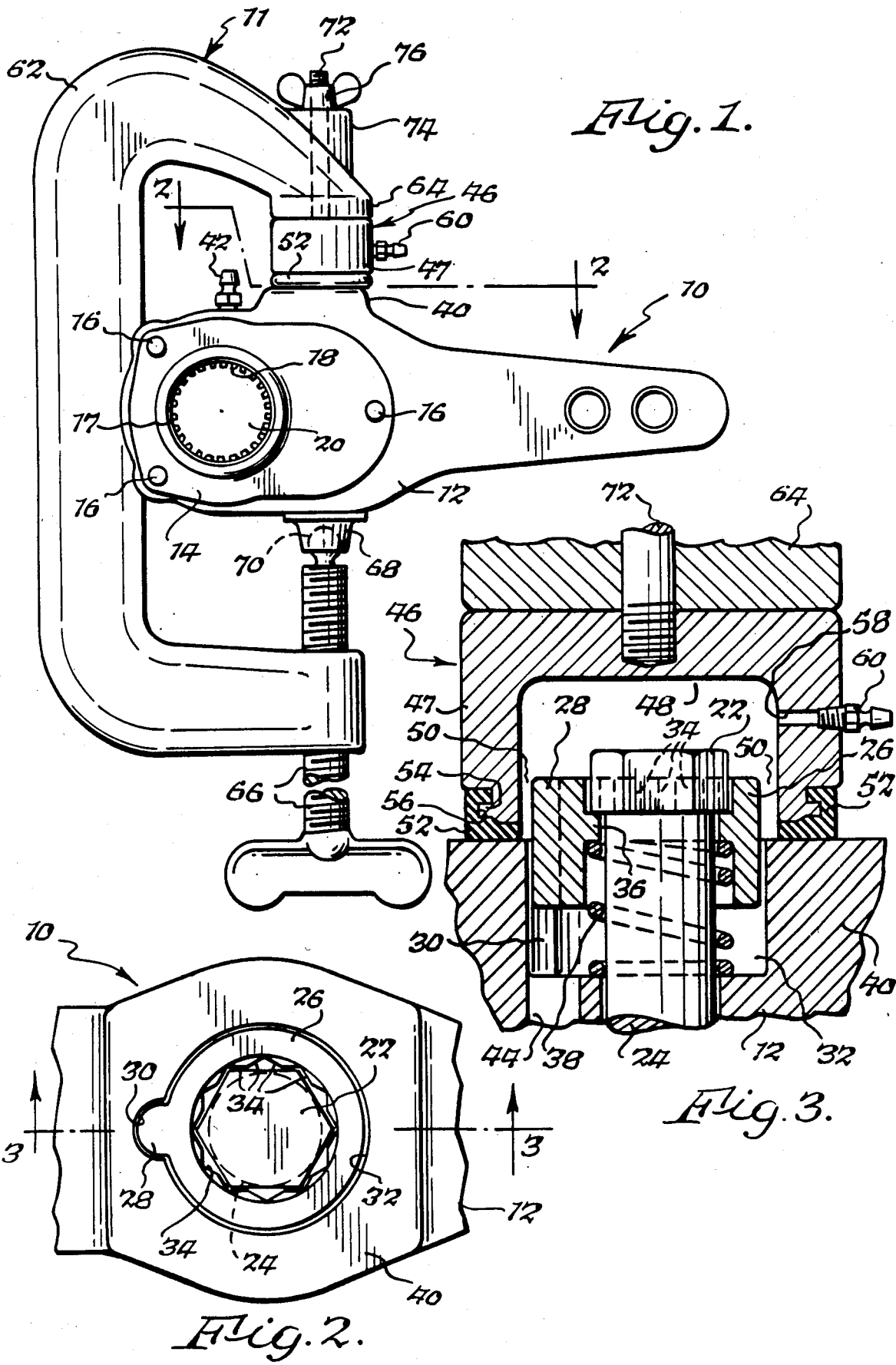

SLACK ADJUSTER LUBRICATOR AND METHODS OF USE

BACKGROUND OF THE INVENTION

The present invention relates generally to novel devices and methods of use, and more specifically, to lubrication devices and methods of lubricating air brake slack adjusters for trucks and other large vehicles.

Each axle of a truck may be equipped with air brake slack adjusters for correcting/adjusting the clearance between brake shoes and drum at each wheel. When servicing brakes to correct the clearance an elevated locking collar surrounding an exterior adjusting head on one side of the slack adjuster must be depressed into the adjuster housing to release the adjusting head and connecting shaft which is keyed to the screw of a worm gear. The released head in the form of a hex nut and worm gear can then be driven to rotate a worm wheel to the extent needed to correct brake clearance.

Ordinarily, a socket type wrench and ratchet is used to manually depress the locking collar surrounding the adjusting head to make the appropriate adjustments. However, because slack adjusters are constantly exposed to road weather, including water, dirt, corrosive chemicals, etc., the locking collar mechanism becomes severely corroded/fouled after a period of service, and cannot be readily depressed in order to release and turn the hex nut for making brake adjustments. Thus, because of such fouled locking mechanisms the usual practice of vehicle service departments has been to install new replacement slack adjusters at considerable cost principally because there has not been an efficient means available for freeing-up their locking mechanisms.

With the use of force, a socket type wrench can in some instances be used to depress and thereby release a "frozen" locking collar. But, because of corrosion build-up and general lack of lubricant on the internal components of locking mechanisms, collars frequently remain depressed in their housing, and do not always return to their elevated locking position after clearance adjustments have been made. Under these circumstances, it has also been common practice of service departments to install new replacement slack adjusters at substantial cost because there has been no means available for lubricating the internal components of their locking mechanisms, which usually lack an appropriate grease fitting.

Accordingly, it would be highly desirable to have an efficient and economical means for packing grease and other lubricant materials into the internal spaces, crevices, voids and surfaces of air brake slack adjuster locking collar mechanisms not having effective lubricant fittings for purposes of freeing-up fouled mechanisms on in-service adjusters, as well as providing protective coatings on surfaces of new and in-service adjusters for preventing future fouling. Such a device would provide important economic advantages in substantially lowering vehicle maintenance costs by significantly reducing the frequency of slack adjuster replacement.

SUMMARY OF THE INVENTION

Accordingly, it is a principal object of the present invention to provide devices for lubricating locking collar mechanisms of vehicular slack adjusters, which comprise a pressurizable lubrication chamber comprising an interior section and an opening to the interior section, the opening and interior section having a configuration which is sufficient to receive and encase the locking collar when in an elevated position, but without being in sealing engagement therewith. The devices also include means for forming a seal at the peripheral edge of the opening to the interior section with a surface of the slack adjuster surrounding the locking collar mechanism when the lubrication chamber and slack adjuster are engaged, and conduit means for delivering lubricant to the lubrication chamber.

It is a further principal object of the invention to provide for the above lubrication devices in combination with various convenient means for holding the lubrication device in compressing engagement with slack adjusters, such holding means including known clamping devices, locking devices, and the like.

It is yet a further principal object of the present invention to provide methods of lubricating the interior and exterior surfaces of locking collar mechanisms of vehicular slack adjusters, especially in the absence of effective lubricant fittings therefore, which comprises the steps of encasing a locking collar mechanism with a pressurizable lubrication chamber, sealing the lubrication chamber with a surface of the slack adjuster surrounding the locking collar mechanism without the interior walls of the chamber being in sealing engagement with the locking collar mechanism when it is in an elevated position, and charging the chamber with lubricant under sufficient pressure to deliver lubricant to said interior surfaces of the locking collar mechanism.

These and other objects, features and advantages of the invention will become more apparent from the detailed written description below. However, for a further understanding of the invention, reference should first be made to the accompanying drawing taken in conjunction with the detail written description below wherein:

FIG. 1 is a side elevational view of an air brake slack adjuster clamped against the lubrication device of the present invention.

FIG. 2 represents and enlarged, partial top view of an air brake slack adjuster showing the brake clearance adjusting head and locking collar arrangement taken along line 2—2 of FIG. 1.

FIG. 3 is an enlarged, sectional view of the slack adjuster locking collar and brake clearance adjusting head taken along line 3—3 of FIG. 2 together with a sectional view of the lubrication device of FIG. 1 encasing the locking collar and brake clearance adjusting head prior to charing with lubricant.

DETAILED DESCRIPTION OF THE INVENTION

Turning first to FIG. 1, there is shown an air brake slack adjuster 10 removed from a vehicle and mounted to lubrication device 11 of the invention. The slack adjuster generally comprises a heavy duty metallic housing 12 with internal components located under cover plate 14 positioned on each side of the housing, which may be "permanently" sealed to the housing with multiple rivets 16. Principal elements of the adjuster include a worm wheel 17 (partially shown) with gearing on its outer surface (not shown). Worm wheel 17 is driven by an internal worm gear (not shown) keyed to shaft 24 (FIG. 3). An accessible outer hex nut head 22 can a be turned with assistance of a ratchet and socket type wrench. Central opening 20 of wheel 17 receives a shaft (not shown) from the vehicle's brake assembly which is keyed to interlock with teeth 18 lining the interior surface of worm wheel 17.

To maintain the desired clearance between brake shoes and drum and for reasons of safety, worm wheel 17 must be locked so it remains stationary when in service. This is achieved by means of a locking collar 26 which surrounds hex nut head 22 when in an elevated position (FIG. 3). Locking collar 26 is slidably mounted for movement in socket 32 of slack adjusted housing 12. Collar 26 includes a key 28 which is also slidably mounted for movement in key way 30 adjacent to socket 32. Key 28 operates to prevent rotational movement of the locking collar in socket 32. The interior surface of collar 26 in proximity to hex nut head 22 has multiple locking grooves 34 which engage and mesh with hex nut head 22 when in an elevated position preventing rotational movement of the hex nut head, worm and worm wheel 17. Locking collar 26 also includes an inner ridge 36 which limits elevational movement of the collar. The locking collar is retained in an elevated-locking position by means of a compression spring 38. Therefore, in order to make any adjustments in brake shoe clearance hex nut head 22 of the slack adjuster must first be released by depressing collar 26 into socket 32 sufficient to clear locking grooves 34.

It will be noted that slack adjuster 10 is equipped with a grease fitting 42 (FIG. 1) in the region of elevated housing section 40, which fitting is intended principally for introducing lubricant to the area of the worm and worm wheel gearing. Adjuster housings have relatively narrow internal lubricant orifices 44, as shown in FIG. 3, communicating with key way 30 or socket 32. However, it has been observed, in most instances, the lubricant introduced through fitting 42 is unable to effectively penetrate through orifice 44 and lubricate the moveable components of the locking collar mechanism in order to protect them from corrosion and maintain the locking mechanism in good working condition.

Hence, lubrication device 46 of the present invention provides an efficient, low cost means for packing grease into the internal spaces, crevices and surfaces of the locking collar without the need for relying on conventional grease fittings on the workpiece. Lubrication device 46 may have, for example, a generally cupshaped body 47 defining an interior lubrication chamber 48. Wall dimensions and overall strength of the body 47 should be sufficient to enable the device to withstand the relatively high internal pressures generated when grease is introduced into chamber 48. In addition, body 47 should be sufficiently rigid to withstand those physical forces employed when the device is compressively engaged with slack adjusters, such as shown in FIG. 1.

For purposes of the present invention opening 50 and the interior section of chamber 48 are intended to have a configuration which is sufficient to receive and encase the locking collar when elevated, including the adjustable hex nut head of the slack adjuster, but without the interior walls of body 47 being in sealing engagement therewith. The objective is to introduce lubricant into chamber 48 under pressure for purposes of first freely coating all outer surfaces of the encased locking collar and adjusting head. As pressure builds up in the chamber lubricant is forced interiorly filling internal spaces and grooves, and coating internal surfaces of the locking collar mechanism. This includes packing grease into spaces between the locking collar and adjuster housing, paces between locking collar grooves 34 and hex nut head 22, as well as voids in locking collar socket 32, etc.

Thus, for convenience and utility purposes interior chamber 48 may be generally cylindrically shaped. However, deviations are permissible provided they meet the foregoing criteria. For example, the configuration of chamber 48 is not intended to include conical shaped interiors designed specifically to engage and seal with grease or zerk type fittings like that disclosed in U.S. Pat. No. 2,272,636. The narrow conical shaped interior of cap 9 of the device of U.S. Pat. No. 2,272,636, if made larger, to receive and lubricate locking collars of slack adjusters of the present invention could not then be used to grasp and hold grease fittings in sealing engagement, as intended by the patentee.

In order to generate sufficient pressure in the interior section of pressurizable lubrication chamber 48 of device 46, the peripheral edge of opening 50 should be lined with a sealing gasket 52 to assure that when the device is engaged with surface 40 of the slack adjuster housing surrounding locking collar 26, lubricant will not be discharged therefrom. Sealing gasket 52 can be retained, for instance, by means of locking bead 54 on body 47 which interconnects with gasket locking groove 56. Alternative retaining means apparent to persons skilled in the art may also be employed.

In order to deliver grease or any other type of lubricant material to pressurizable lubrication chamber 48 the device includes a lubricant orifice 58 which is drilled and tapped for receiving zerk fitting 60.

Lubrication device 46 is preferably used in combination with any convenient means for holding and compressing together with a slack adjuster. For example, lubrication device 46 can be mounted to virtually any type of locking device which is either hand held or customarily mounted to a stationary location like a workbench. This would include hand held tools like various clamps, tongs, pliers, and the so-called locking-releasing hand held vise type pliers, generally of the kind disclosed in U.S. Pat. No. 3,101,812, to name but a few. Holding means would also include stationary bench-mounted vises in combination with lubrication device 46 which can be mounted to either the fixed/stationary vise jaw, or the opposite jaw which is moveable relative to the stationary jaw.

A specific representative embodiment of lubrication device 46 in combination with a hand held tool is illustrated in FIG. 1. Device 11 comprises a C-clamp 62 having a stationary clamping pad 64, a threaded screw 66 and a moveable pad 68 opposite stationary pad 64. Lubrication device 46 may include means for mounting to either pad 64 or 68. The expression "means for mounting" for purposes of the present invention is intended to include "permanent" mounting, such as by welding to stationary pad 64, or detachably mounting, such as by bolting to clamping pad 64, wherein body 47 of lubrication device 46 includes a threaded stud 72 passing through a drilled hole in pad 64, clamp 62 and finally through stage 74 where it is secured by means of wing nut 76. it is to be understood, that means for mounting may include placement of lubrication device 46 on pad 68 wherein the device 46 moves relative to stationary pad 64. Alternatively, instead of welding lubrication device 46 to pad 68 or pad 64 of clamp 62, pad 68 which is mounted on to ball 70 of screw 66 can be replaced with a socket type connector (not shown) on the backside of body 47 of lubrication device 46. Thus, it can be seen that the present invention provides for great flexibility with resect various means for mounting and holding lubrication device 46, so that it can be conveniently coupled with the slack adjuster. Although the lubrication device of the present invention has been illustrated specifically in combination with a conventional C-clamp, alternative means for holding and methods of mounting the lubrication device will be readily apparent to those or ordinary skill, and it is to be understood that the present invention is intended to encompass all such alternatives.

Grease fitting 60 of the lubrication device is adapted to be engaged by the conventional coupling of a pressure lubricant injecting device, such as a so-called grease gun (not shown). Such grease guns and the like are conventional, well known to the lubricating art, and their details form no part of the present invention.

While the invention has been described in conjunction with various examples thereof, this is illustrative only. Accordingly, many alternatives, modifications and variations will be apparent to persons skilled in the art in light of the foregoing detailed description, and it is therefore intended to embrace all such alternatives, modifications and variations as to fall within the spirit and broad scope of the appended claims.

I claim:

1. A method of lubricating the interior and exterior surfaces of a locking collar mechanism of a vehicular slack adjuster, which comprises the steps of encasing the locking collar mechanism with a pressurizable lubrication chamber, sealing the lubrication chamber with a surface of the slack adjuster surrounding the locking collar mechanism without being in sealing engagement with said locking collar mechanism when said locking collar is elevated, and charging said chamber with lubricant under sufficient pressure to deliver lubricant to said interior and interior surfaces of the locking collar mechanism.

2. In combination with a vehicular slack adjuster having a locking collar mechanism, a lubrication device for said slack adjuster comprising a pressurizable lubrication chamber with an opening at one end for enclosing said locking collar mechanism, sealing means at said opening for forming a seal between said lubrication chamber and said slack adjuster, aperture means for introducing lubricant in said lubrication chamber, and means for compressively engaging said lubrication chamber with said slack adjuster.

3. The device of claim 2 wherein said means for compressively engaging said lubrication chamber with said slack adjuster comprises a clamp.

4. The device of claim 2 wherein said means for compressively engaging said lubrication chamber with said slack adjuster comprises a vise.

5. The device of claim 2 wherein said means for compressively engaging said lubrication chamber with said slack adjuster comprises a pliers.

6. The device of claim 2 wherein said means for compressively engaging said lubrication chamber with said slack adjuster comprises a hand held visepliers.

7. The device of claim 2 wherein said pressurizable lubrication chamber is substantially cylindrically shaped.

8. The device of claim 7 wherein said means for compressively engaging said lubrication chamber with said slack adjuster comprises a clamp.

9. The device of claim 7 wherein said aperture means for delivering lubricant to said lubrication chamber comprises a lubricant fitting.

* * * * *